UNITED STATES PATENT OFFICE.

HEINRICH HEIMANN, OF BERLIN, GERMANY, ASSIGNOR TO ACTIEN GESELLSCHAFT FÜR ANILIN FABRIKATION, OF BERLIN, GERMANY.

SAFRANIN DYE AND PROCESS OF MAKING SAME.

No. 872,815.　　　　Specification of Letters Patent.　　　　Patented Dec. 3, 1907.

Application filed August 2, 1907. Serial No. 386,766.

*To all whom it may concern:*

Be it known that I, HEINRICH HEIMANN, a citizen of the German Empire, residing at Berlin S. O. 36, Lohmühlenstrasse 142, Germany, have invented certain new and useful Improvements in New Dyestuffs of the Safranin Series and Processes of Making Same, of which the following is a specification.

I have found that a new class of nitro-safranins, namely such nitro-safranins which are exclusively composed of benzene nuclei, may be obtained by starting from a para-nitro-para'-aminodiphenylamin sulfonic acid, which acids are converted into indamin by joint oxidation with a secondary or tertiary aromatic amin or a sulfonic acid of such an amin, these indamins on their part yield the new nitro-safranins by further joint oxidation with an aromatic amin or with a sulfonic acid of such an amin. As an example of such a nitro-safranin may be cited the dyestuff which is obtained by joint oxidation (for instance with potassium bichromate and a mineral acid) of para-nitro-para'-aminodiphenylamin-ortho-sulfonic acid with ethylbenzylanilin sulfonic acid and converting the indamin thus obtained into the safranin derivative by further joint oxidation with sulfanilic acid. I have found, that these new coloring matters of the safranin series, which, generally speaking, dye wool from an acid bath clear blue-red tints, are converted by the action of a suitable reducing agent into the corresponding amino-compounds, these new amido-safranins being very valuable dyestuffs on behalf of their dyeing wool from an acid bath clear blue tints, which, generally speaking, are fast to light and alkalies.

The following example serves to illustrate my invention, the parts being by weight:

Example: 33 parts of the sodium salt of the para-nitro-para'-aminodiphenylamin-ortho-sulfonic acid and 31 parts of the sodium salt of ethylbenzylanilin sulfonic acid

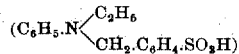

are dissolved together in 600 parts of cold water, whereupon joint oxidation is effected by allowing to run into a cold aqueous solution of 20 parts of potassium bichromate added with 20 parts of hydrochloric acid of 20° Baumé specific gravity. The formation of the indamin begins at once and is shown by the green color of the solution; the reaction being finished, a concentrated aqueous solution of 20 parts of the sodium salt of sulfanilic acid and of 20 parts of potassium bichromate are added. Now the mass is warmed up till a clear red-violet colored solution has formed, and then filtered from the chromium hydroxid which has separated out. From the filtrate the safranin-compound is precipitated by the addition of common salt; it is isolated by filtering and drying. The product thus obtained is a dark-red brown powder which easily dissolves in hot water, but rather difficultly in cold water, to a red-violet solution, which solution on the addition of concentrated soda-lye, and also of concentrated ammonia, turns to blue, and which solution on the addition of some drops of concentrated hydrochloric acid remains unaltered, whereas adding more hydrochloric acid changes to blue and then to green-blue. The dyestuff is difficultly soluble in alcohol to a red-violet solution; with concentrated sulfuric acid it forms a green solution, which on the addition of some ice turns to blue and by more ice becomes bluish-red.

In order to convert the nitro-safranin as obtained above into the corresponding amino-compound it is brought into reaction with a suitable reducing agent and in this direction I proceed for instance as follows: 10 parts of the nitro-dyestuff manufactured as above are dissolved in 100 parts of water, this solution weakly acidulated by means of hydrochloric or sulfuric acid and then added in a gentle heat with finely ground powder of iron. According to the quantity of iron added not only the nitro-group will be reduced, but also more or less of the safranin will be converted into the so-called "leuco" compound. Therefore the end of the reaction to be performed will be shown by the fact that the solution shows a pure blue color or, when the solution has more or less decolorized, that it oxidizes to a pure blue solution. This point being attained the solution is added with sodium carbonate in order to separate the iron, filtered and from the filtrate the amino-dyestuff is precipitated by adding common salt, whereupon it is isolated by filtering and drying. The product thus obtained, when pulverized, forms a dark brown powder with bronze-like luster, which easily dissolves in hot water, but rather difficultly in cold water, to a blue-violet colored solution, which solution on the addition of some concentrated soda-lye turns to a more dull violet and which solution on the addition of concentrated ammonia remains unaltered, whereas adding of a small quantity of concentrated hydrochloric acid changes the color to red and whereas on adding more of the acid the solution becomes blue and then green-blue. In alcohol the dyestuff dissolves difficultly to a blue solution, whereas it dissolves in concentrated sulfuric acid to a green solution, which solution on the addition of some ice becomes blue, whereas by adding more ice the color turns to bluish red.

This new dyestuff which appears to have the following constitution formula:

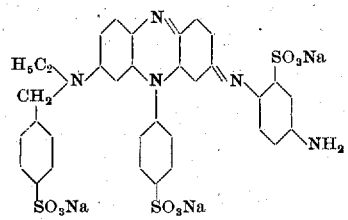

dyes wool from an acid bath (acetic acid or sulfuric acid) a clear blue tint which is fast to light and to alkalies.

It is obvious to those skilled in the art that my present invention is not limited to the foregoing example or to the details given therein and many variations may be made within the example without departing from the scope of my invention.

First it may be stated that instead of the ethylbenzylanilin sulfonic acid used in the foregoing example another suitable sulfonic acid of a secondary or tertiary amin or a non-sulfonated secondary or tertiary amin may be employed; as such other suitable compounds in forming an indamin according to the present invention I name for instance dimethylanilin, methylbenzylanilin sulfonic acid, dibenzylanilindisulfonic acid, or the like. Furthermore, for the sulfanilic acid, serving in my foregoing example as the third component in the second step of my process, namely in converting the indamin into a corresponding safranin, there may be substituted another suitable aromatic aminosulfonic acid, such as for instance metanilic acid or chlorometanilic acid, or also a non-sulfonated aromatic amin, such as for instance para-toluidin, para-chloranilin or the like. It may be stated that in some cases it is preferable to start from a para-nitro-para'-amino-diphenylamindisulfonic acid in order to obtain an indamin which is sufficiently soluble in cold or at least in hot water. It is also convenient to say that the rather great number of dyestuffs which can thus be produced, either nitro- or amino-safranins, resemble very much each other in their physical and chemical behavior as well as in their tinctorial qualities. Finally, as to the several steps of my process according to the present invention I state that the two oxidation processes (forming the indamin and then the safranin) may be effected by any other suitable oxidizing agent than that given in the example; also in order to reduce the nitro-safranin another reducing agent than iron and acid (compare the above example), whether acid, neutral or alkaline, may be employed, such as for instance sodium sulfid.

Having now described my invention and the manner in which the same can be performed what I claim is,—

1. The hereinbefore-described manufacture of new dyestuffs of the safranin series consisting in forming an indamin by the joint oxidation of a para-nitro-para'-amino-diphenylamin sulfonic acid with a secondary or tertiary aromatic amin or a sulfonic acid of such an amin, converting the indamin thus formed by further joint oxidation with an aromatic amin or with a sulfonic acid of such an amin into the corresponding nitro-safranin dyestuff and reducing the nitro-group of this dyestuff by the action of a suitable reducing agent.

2. As new articles of manufacture the hereinbefore-described new dyestuffs of the safranin-series, containing an amino-group which dyestuffs may be obtained by first oxidizing a para-nitro-p'-aminodiphenylamin sulfonic acid with a secondary or tertiary aromatic amin or a sulfonic acid of such an amin to the corresponding indamin, then oxidizing the indamin thus obtained with an aromatic amin or the sulfonic acid of such an amin to the corresponding nitro-safranin and reducing the nitro-group by the action of a suitable reducing agent, these new dyestuffs dyeing wool from an acid bath clear tints varying from greenish-blue to reddish-blue which are fast to light and to alkalies, which dyestuffs are soluble in water with a blue coloration, which solution on the addition of some concentrated soda-lye becomes more reddish and more dull, and which solution on the addition of a small quantity of concentrated hydrochloric acid turns from bluish-red to red, these dyestuffs being soluble in alcohol to a blue solution, and these dyestuffs dissolving in concentrated sulfuric acid to a green solution which solution on the addition of some ice becomes blue, whereas by adding more ice the color turns to bluish-red.

3. As a new article of manufacture the new dyestuff of the safranin series which may be obtained by first oxidizing para-nitro-para'-aminodiphenylamin-orthosulfonic acid with ethylbenzylanilin sulfonic acid to the corresponding indamin, then oxidizing the indamin thus obtained with sulfanilic acid to the corresponding nitro-safranin and reducing the nitro-group by the action of iron powder in the presence of hydrochloric acid, this new dyestuff dyeing wool from an acid bath a clear blue tint which is fast to light and to alkali, this dyestuff being in the shape of the sodium salt when dried and pulverized, a dark brown powder with bronze-like luster, which dyestuff dissolves in water to a blue solution which solution on the addition of some concentrated soda-lye turns to a more dull violet and which solution on the addition of concentrated ammonia remains unaltered, whereas adding of a small quantity of concentrated hydrochloric acid changes the color to red and whereas on adding more of the acid the solution becomes blue and then green blue, this dyestuff being difficultly soluble in alcohol to a blue solution and this dyestuff dissolving in concentrated sulfuric acid to a green solution which solution on the addition of some ice becomes blue, whereas by adding more ice the color turns to bluish red.

In testimony whereof I have hereunto set my hand in presence of two subscribing witnesses.

HEINRICH HEIMANN.

Witnesses:
WOLDEMAR HAUPT,
HENRY HASPER.